(12) United States Patent
Glanzer et al.

(10) Patent No.: US 11,092,354 B2
(45) Date of Patent: Aug. 17, 2021

(54) SYSTEMS AND METHODS FOR FLOW CONTROL IN AN HVAC SYSTEM

(71) Applicant: Johnson Controls Technology Company, Auburn Hills, MI (US)

(72) Inventors: Rachel A. Glanzer, Milwaukee, WI (US); Brennan H. Fentzlaff, Oconomowoc, WI (US); Kirk H. Drees, Cedarburg, WI (US); John M. House, Saint-Leonard (CA); Timothy I. Salsbury, Mequon, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/447,783

(22) Filed: Jun. 20, 2019

(65) Prior Publication Data

US 2020/0400338 A1    Dec. 24, 2020

(51) Int. Cl.
*G05B 99/00* (2006.01)
*F24F 11/84* (2018.01)
(Continued)

(52) U.S. Cl.
CPC .............. *F24F 11/84* (2018.01); *F16K 1/52* (2013.01); *F24F 13/30* (2013.01); *G05B 2219/2614* (2013.01)

(58) Field of Classification Search
CPC .......................... F24F 11/84; G05B 2219/2614
(Continued)

(56) References Cited

U.S. PATENT DOCUMENTS

| 3,946,757 A | 3/1976 | Wallace |
| 4,431,020 A | 2/1984 | Kowalski |

(Continued)

FOREIGN PATENT DOCUMENTS

| CH | 711558 A1 | 3/2017 |
| CN | 2777312 Y | 5/2006 |

(Continued)

OTHER PUBLICATIONS

Henze et al, Improving Campus Chilled Water System With Intelligent Control Valves: A Field Study, 2013, AEI@ASCE, p. 10 (Year: 2013).*

(Continued)

*Primary Examiner* — Suresh Suryawanshi
(74) *Attorney, Agent, or Firm* — Foley & Lardner LLP

(57) ABSTRACT

A method for controlling flow in a heating, ventilation, and air conditioning (HVAC) system that imposes an upper limit on the flow of fluid through a heating or cooling coil. Imposing this limit on the flow rate ensures that a temperature change across the coil remains above a minimum threshold and can significantly reduce energy waste. The method includes receiving a first temperature measurement associated with an inlet of the coil, receiving a second temperature measurement associated with an outlet of the coil, and receiving a flow measurement associated with the valve, applying the first temperature measurement, the second temperature measurement, and the flow measurement as input to a model, determining a maximum flow rate that ensures that a difference between the first temperature measurement and the second temperature measurement is above a threshold using the model, and operating the valve in accordance with the maximum flow rate.

20 Claims, 15 Drawing Sheets

(51) Int. Cl.
*F24F 13/30* (2006.01)
*F16K 1/52* (2006.01)

(58) Field of Classification Search
USPC .................................................. 700/276
See application file for complete search history.

(56) References Cited

U.S. PATENT DOCUMENTS

| | | | |
|---|---|---|---|
| 5,904,292 A | 5/1999 | McIntosh | |
| 6,207,936 B1* | 3/2001 | de Waard | G05B 13/048 |
| | | | 219/497 |
| 6,343,617 B1 | 2/2002 | Tinsley et al. | |
| 6,352,106 B1 | 3/2002 | Hartman | |
| 7,096,093 B1 | 8/2006 | Hansen et al. | |
| 7,231,931 B2 | 6/2007 | Lull et al. | |
| 7,266,427 B2 | 9/2007 | Hansen et al. | |
| 7,434,477 B2 | 10/2008 | Lull et al. | |
| 7,637,315 B2 | 12/2009 | Ichinose et al. | |
| 7,798,170 B2 | 9/2010 | Hotz et al. | |
| 8,109,289 B2 | 2/2012 | Trnka et al. | |
| 8,275,483 B2 | 9/2012 | Higgins | |
| 8,833,384 B2 | 9/2014 | Burt | |
| 9,267,694 B2 | 2/2016 | Lang et al. | |
| 9,658,628 B2 | 5/2017 | Burt | |
| 9,715,237 B2 | 7/2017 | Schick et al. | |
| 9,874,880 B2 | 1/2018 | Thuillard et al. | |
| 10,465,932 B2 | 11/2019 | Guidetti et al. | |
| 10,824,127 B1* | 11/2020 | Salsbury, I | G05B 23/0256 |
| 2002/0117214 A1 | 8/2002 | Tucker et al. | |
| 2003/0125840 A1 | 7/2003 | Lunzman | |
| 2006/0157576 A1* | 7/2006 | Eisenhour | B60H 1/08 |
| | | | 237/28 |
| 2007/0012367 A1 | 1/2007 | Hotz et al. | |
| 2008/0115848 A1 | 5/2008 | Bruck et al. | |
| 2009/0164050 A1 | 6/2009 | Ahmad et al. | |
| 2010/0147394 A1 | 6/2010 | Trnka et al. | |
| 2011/0054701 A1 | 3/2011 | Wang et al. | |
| 2011/0105012 A1 | 5/2011 | Niederhauser et al. | |
| 2011/0114304 A1 | 5/2011 | Keller | |
| 2011/0162742 A1 | 7/2011 | Ulens et al. | |
| 2012/0141303 A1 | 6/2012 | Caldwell et al. | |
| 2013/0068313 A1 | 3/2013 | George et al. | |
| 2013/0113402 A1 | 5/2013 | Grabinger et al. | |
| 2013/0199627 A1 | 8/2013 | Gilbert | |
| 2013/0220590 A1 | 8/2013 | Lang et al. | |
| 2014/0007613 A1 | 1/2014 | Uchida et al. | |
| 2014/0034145 A1 | 2/2014 | Burt | |
| 2014/0067135 A1 | 3/2014 | Lehnert et al. | |
| 2014/0083673 A1 | 3/2014 | Thuillard et al. | |
| 2014/0097367 A1 | 4/2014 | Burt | |
| 2014/0261714 A1 | 9/2014 | Burt | |
| 2014/0277764 A1 | 9/2014 | Burt | |
| 2015/0057816 A1 | 2/2015 | Schick et al. | |
| 2015/0088321 A1 | 3/2015 | Schmidt et al. | |
| 2015/0176931 A1 | 6/2015 | Aeberhard et al. | |
| 2015/0198263 A1 | 7/2015 | Ibsen et al. | |
| 2015/0277447 A1 | 10/2015 | Schmidt | |
| 2015/0334878 A1 | 11/2015 | Long et al. | |
| 2016/0054741 A1* | 2/2016 | Thuillard | F24F 11/62 |
| | | | 700/276 |
| 2016/0139608 A1 | 5/2016 | Eickhoff | |
| 2016/0246306 A1 | 8/2016 | Giubertoni | |
| 2017/0029256 A1 | 2/2017 | Das et al. | |
| 2017/0227134 A1 | 8/2017 | Tuineag | |
| 2018/0352683 A1* | 12/2018 | Karrat | F24F 11/00 |
| 2019/0063778 A1 | 2/2019 | Passoni et al. | |
| 2021/0025627 A1 | 1/2021 | Washiyama et al. | |

FOREIGN PATENT DOCUMENTS

| | | | |
|---|---|---|---|
| CN | 1837996 A | 9/2006 | |
| CN | 1862421 A | 11/2006 | |
| CN | 200968437 Y | 10/2007 | |
| CN | 201011392 Y | 1/2008 | |
| CN | 201310667 Y | 9/2009 | |
| CN | 201330874 Y | 10/2009 | |
| CN | 201902628 U | 7/2011 | |
| CN | 202349311 U | 7/2012 | |
| DE | 22 16 464 A1 | 10/1973 | |
| DE | 35 33 160 A1 | 3/1986 | |
| DE | 41 40 408 A1 | 6/1993 | |
| DK | 201400014 A1 | 1/2015 | |
| EP | 2 395 289 A2 | 12/2011 | |
| EP | 2 423 607 A2 | 2/2012 | |
| GB | 2544799 A | 5/2017 | |
| WO | WO-98/25086 | 6/1998 | |
| WO | WO-2006/015220 A2 | 2/2006 | |
| WO | WO-2008085153 A2 * | 7/2008 | F24F 11/83 |
| WO | WO-2012/065275 A1 | 5/2012 | |
| WO | WO-2014/033496 A1 | 3/2014 | |
| WO | WO-2017/050588 A1 | 3/2017 | |
| WO | WO-2017/060031 A1 | 4/2017 | |

OTHER PUBLICATIONS

Frese Delta T, URL: https://www.frese.eu/hvac/en-GB/Products/Energy-Management/Frese-DELTA-T-Control-System, 2017, 37 pages.

Belimo Aircontrols (USA), Inc. "Belimo Energy Valve Technical Documentation," www.EnergyValve.com. 60 pages. (Apr. 2017).

Henz (et al.), "Improving Campus Chilled Water Systems with Intelligent Control Valves: A Field Study," AEI ASCE, p. 102-111 (2013).

* cited by examiner

SYSTEMS AND METHODS FOR FLOW CONTROL IN AN HVAC SYSTEM

BACKGROUND

The present disclosure relates generally to building control systems and more particularly to the field of building management systems. A building management system (BMS) is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

A BMS and associated devices may be responsible for controlling flow of fluid in an HVAC system. For example, heated or chilled fluid may be provided through a heating or cooling coil to provide heating or air conditioning for a building space. Some previous systems and methods for controlling flow may operate inefficiently and waste energy. Systems and methods that can limit energy waste are generally desired.

SUMMARY

One implementation of the present disclosure is a method for operating a valve that controls flow of liquid through a coil in an HVAC system. The method includes receiving a first temperature measurement associated with an inlet of the coil, receiving a second temperature measurement associated with an outlet of the coil, and receiving a flow measurement associated with the valve. The method also includes applying the first temperature measurement, the second temperature measurement, and the flow measurement as input to a model, determining a maximum flow rate that ensures that a difference between the first temperature measurement and the second temperature measurement is above a threshold using the model, and operating the valve in accordance with the maximum flow rate.

Another implementation of the present disclosure is an HVAC system. The HVAC system includes a coil that facilitates heating or cooling, a valve that controls flow of a liquid through the coil, a pump that provides the liquid at an inlet of the valve, an actuator that controls a position of the valve, and a controller with a processor and a memory. The memory of the controller includes a control application that, when executed by the controller, causes the controller to receive a first temperature measurement associated with an inlet of the coil, receive a second temperature measurement associated with an outlet of the coil, receive a flow measurement associated with the inlet of the valve, apply the first temperature measurement, the second temperature measurement, and the flow measurement as input to a model, determine a maximum flow rate that ensures that a difference between the first temperature measurement and the second temperature measurement is above a threshold using the model, and provide a control signal to the actuator to operate the valve in accordance with the maximum flow rate.

Yet another implementation of the present disclosure is a flow control device for use in an HVAC system. The device includes a valve that controls flow of a liquid through a coil and an actuator that controls a position of the valve. The actuator includes a processor and a memory. The memory of the actuator includes a control application that, when executed by the actuator, causes the actuator to receive a first temperature measurement associated with an inlet of the coil, receive a second temperature measurement associated with an outlet of the coil, receive a flow measurement associated with the inlet of the valve, apply the first temperature measurement, the second temperature measurement, and the flow measurement as input to a model, determine a maximum flow rate that ensures that a difference between the first temperature measurement and the second temperature measurement is above a threshold using the model, and operate the valve in accordance with the maximum flow rate.

Those skilled in the art will appreciate this summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, systems and methods for flow control in an HVAC system are shown, according to some embodiments. The systems and methods described herein provide a dynamic model-based approach to imposing an upper limit on the flow of fluid through a heating or cooling coil. This limit imposed on the flow rate ensures that a temperature change across the coil remains above a minimum threshold. As a result, energy savings can be realized by conserving pumping power and lowering demand on devices such as chillers and boilers. A recursive model with a single parameter that relates flow to the temperature change across a coil can be developed such that an appropriate maximum flow rate and minimum temperature change across the coil can be determined for a variety of different applications. The parameter can be solved for using recursive least squares.

Building Management System

Figure 1:
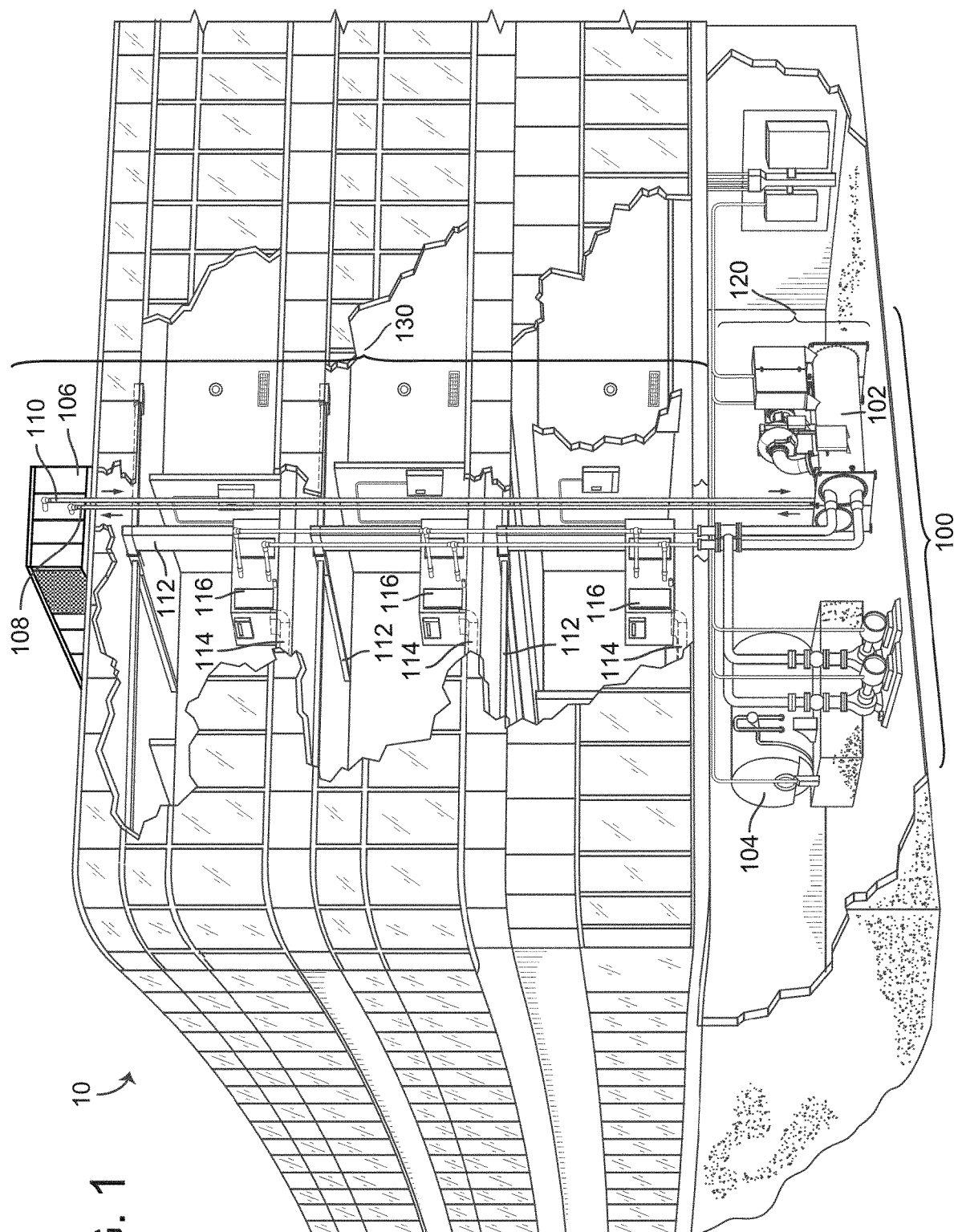
FIG. 1 is a drawing of a building equipped with a building management system (BMS) and an HVAC system, according to some embodiments.

Referring now to FIGS. 1-4, an example building management system (BMS) and HVAC system in which the systems and methods of the present disclosure can be implemented are shown, according to an example embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An example waterside system and airside system which can be used in HVAC system 100 are described in greater detail with reference to FIGS. 2 and 3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
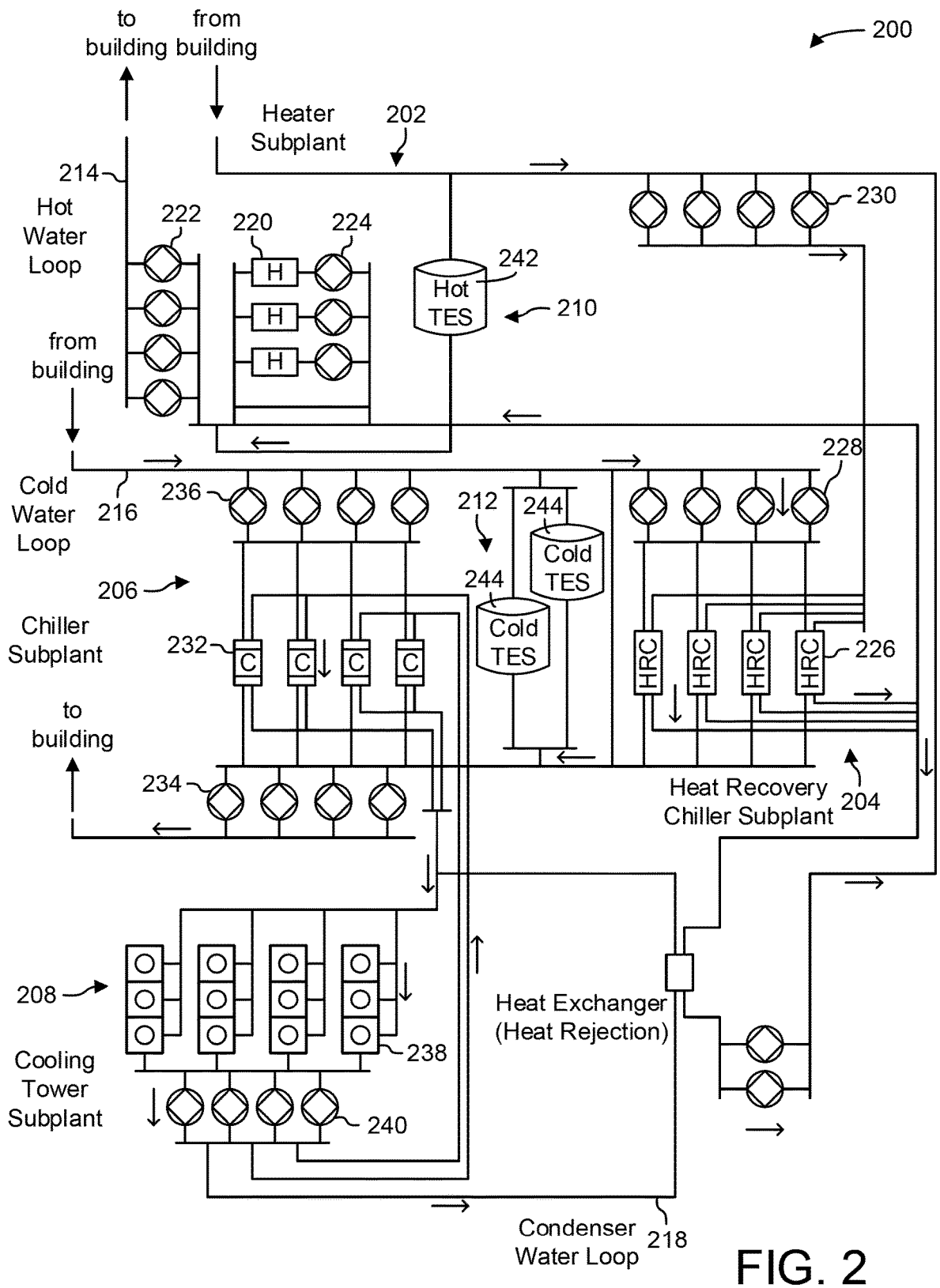
FIG. 2 is a schematic of a waterside system which can be used as part of the HVAC system of FIG. 1, according to some embodiments.

Referring now to FIG. 2, a block diagram of a waterside system 200 is shown, according to an example embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
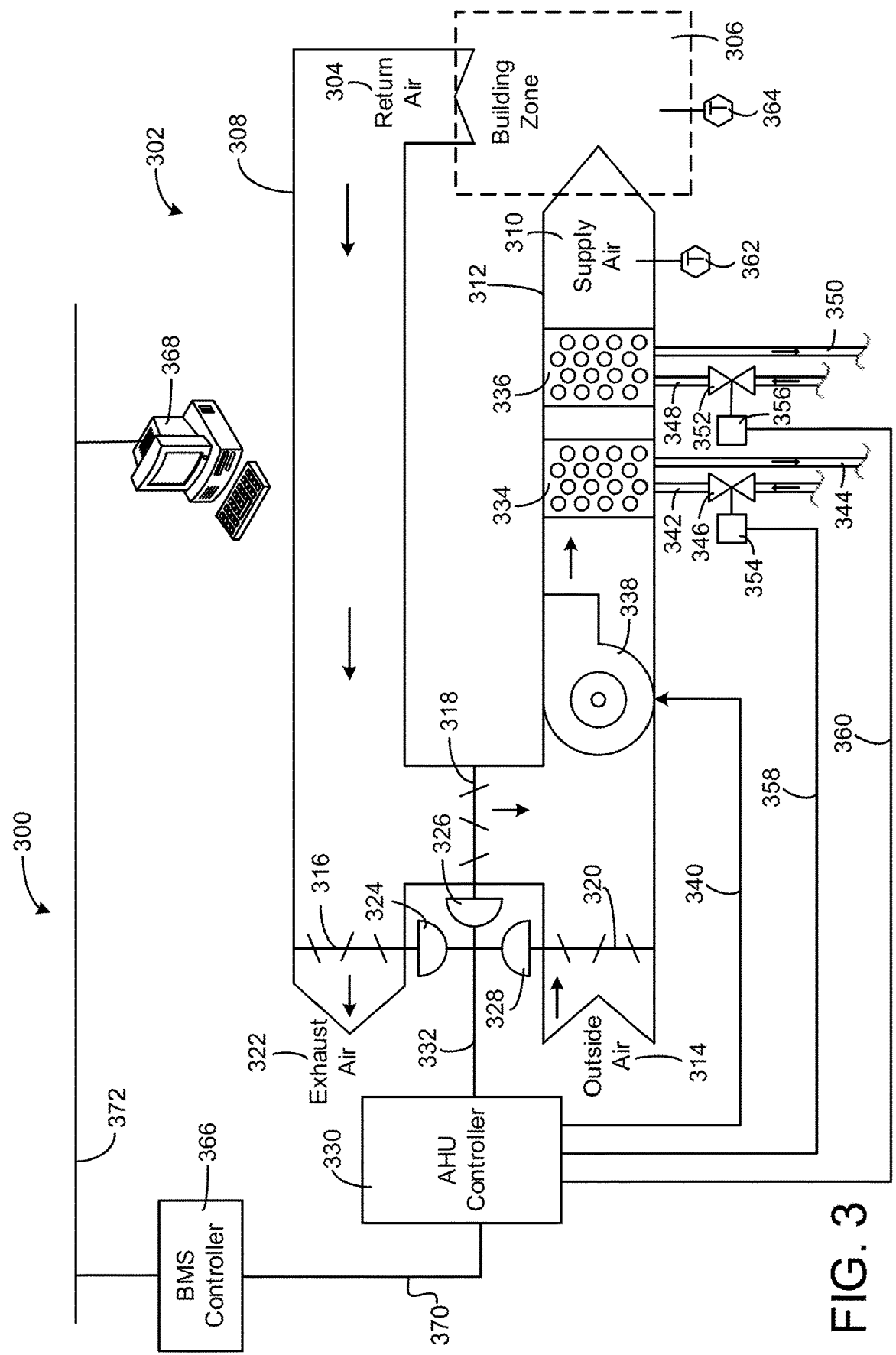
FIG. 3 is a block diagram of an airside system which can be used as part of the HVAC system of FIG. 1, according to some embodiments.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
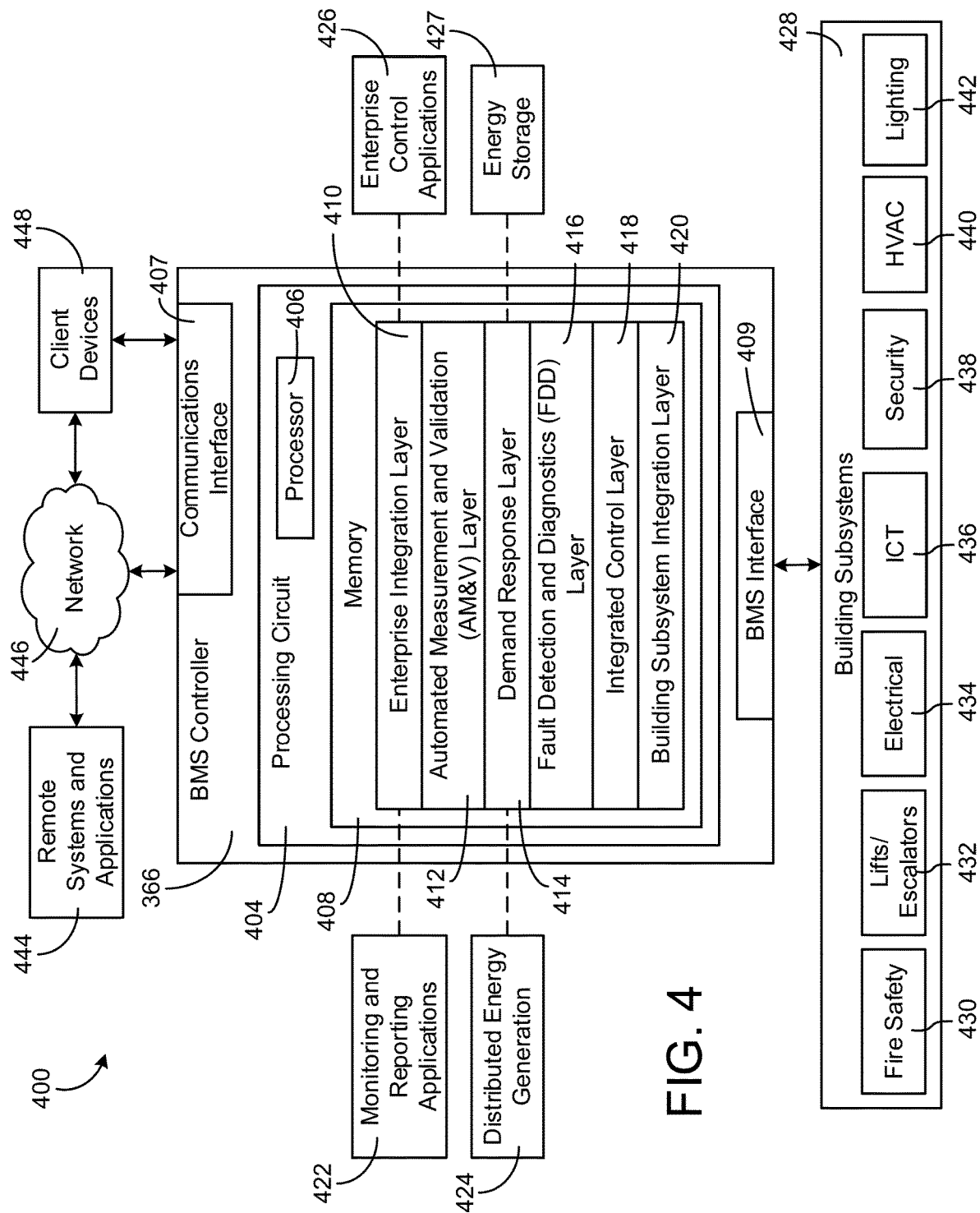
FIG. 4 is a block diagram of a BMS which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stored to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Flow Control

Figure 5:
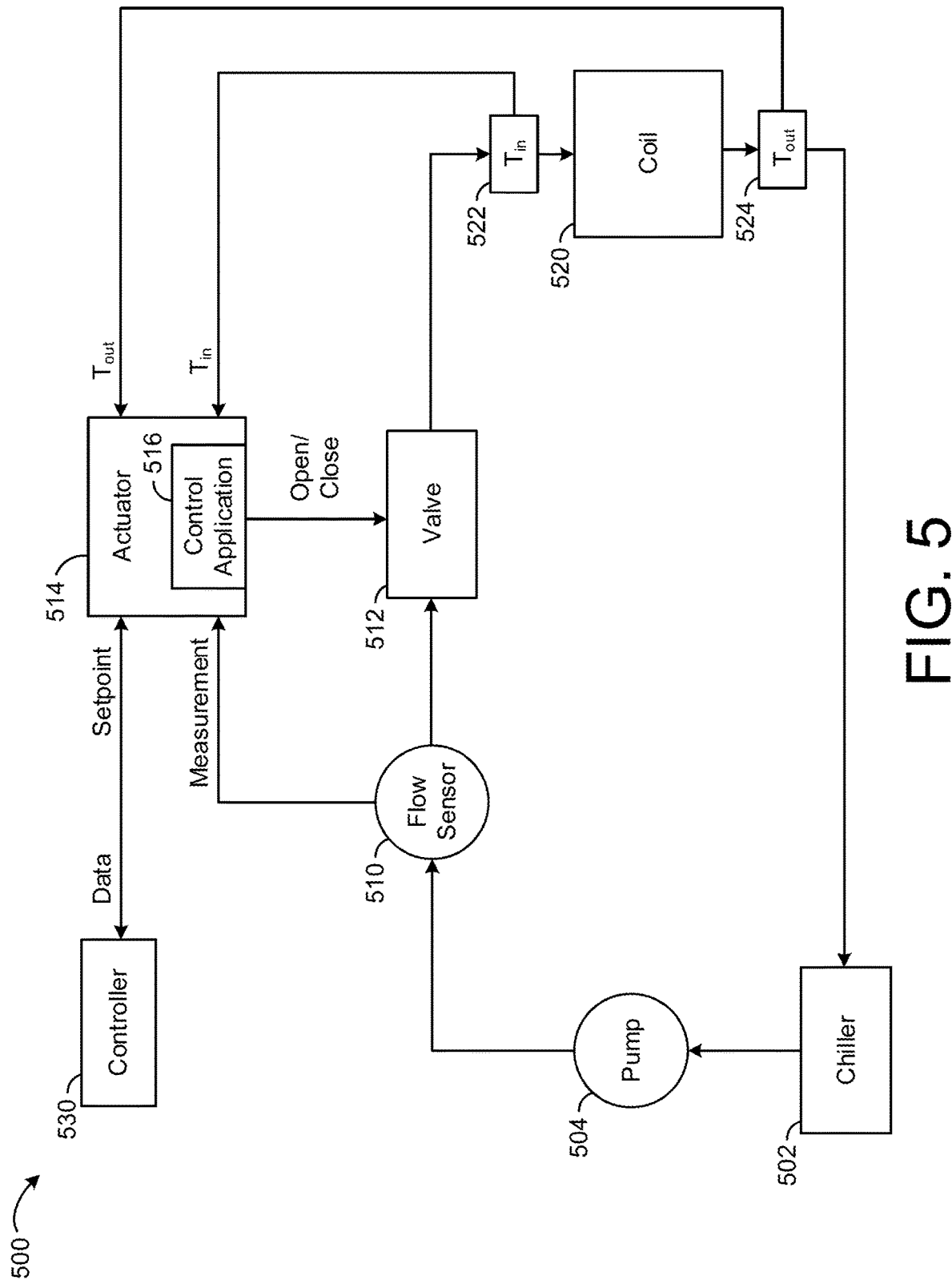
FIG. 5 is a block diagram of an example flow control system associated with the BMS of FIG. 4, according to some embodiments.

Referring now to FIG. 5, a block diagram of an example flow control system 500 is shown, according to some embodiments. System 500 generally involves controlling the flow of chilled fluid through a cooling coil to provide a desired amount of air conditioning to a building space. System 500 is shown to include a chiller 502, a pump 504, a valve 512, an actuator 514, and a cooling coil 520. These components may be similar to chiller 102, pumps 234, actuator 354, valve 346, and coil 334 as described above, for example. System 500 is also shown to include a flow sensor 510 that provides flow measurements to actuator 514 in addition to a temperature sensor 522 that provides a temperature measurement associated with the inlet of coil 520 to actuator 514 and a temperature sensor 524 that provides a temperature measurement associated with the outlet of coil 520 to actuator 514. System 500 is also shown to include a controller 530 that provides a setpoint and possibly other data to actuator 514 and also receives data from actuator 514 (e.g., temperature data, position data, flow data). Controller 530 may be similar to AHU controller 330 and/or BMS controller 366 as described above. Sensors 510, 522, and 524 may provide measurements to controller 530 instead of or in addition to providing measurements to actuator 514.

Actuator 514 may be configured to execute a control application 516 in order to control the flow of chilled fluid through cooling coil 520 by moving valve 512 between an open position and a closed position. Control application 516 can be developed using a variety of programming languages such as MATLAB, C, Python, Java, etc. Actuator 514 may include a processing circuit with at least one processor and a memory that executes control application 516 and maintains data associated with system 500. It will be appreciated that control application 516 may also be executed by controller 530 and/or in accordance with control logic executed by controller 530. For example, controller 530 may be responsible for controlling a fan such as fan 338 described above that blows air over coil 520 to provide air conditioning to a building space.

Control application 516 can be configured to determine a maximum flow rate that ensures that a difference between temperature measurements generated by sensor 522 and sensor 524 remains above a threshold. This difference may be referred to as a temperature change ($\Delta T$) across coil 520. This functionality allows system 500 to maintain efficiency by preventing operation within a "waste zone" wherein the marginal gain in heat transfer achieved by increasing the flow of fluid through coil 520 is relatively low. As a result, power consumed by chiller 502 and pump 504 may be conserved by operating system 500 in accordance with the maximum flow rate. In general, as the flow rate through coil 520 increases, the slope of the rate of heat transfer associated with coil 520 decreases significantly. The slope of $\Delta T$ also decreases significantly when increasing flow thorough coil 520. Accordingly, limiting the maximum flow rate through coil 520 can be advantageous. Further, if not enough flow is provided through coil 520, then the power output by coil 520 may be less than desired, and inadequate cooling of a building space may result.

Control application 516 may generally use control inputs of $T_{w,i}$ (inlet water temperature, such as measured by sensor 522), $T_{w,o}$ (outlet water temperature, such as measured by sensor 524), $T_{a,i}$ (inlet air temperature), $\dot{m}_w$ (flow rate, such as measured by sensor 510), $u_{vlv}$ (valve position), and $\dot{m}_{w,max}$ (maximum flow rate through coil 520 that can physically be achieved by system 500). In some cases, $T_{a,i}$ may not be available, and design values for $T_{a,i}$ (and possibly $T_{w,i}$) can be used to normalize $\Delta T$ across the coil. A normalized $\Delta T$ can be represented as $\overline{\Delta T_w}$ and can be described by the equation $$\overline{\Delta T_w} = \frac{\Delta T}{\Delta T_{max}} = \frac{T_{w,o} - T_{w,i}}{T_{a,i} - T_{w,i}}$$

and a normalized $\dot{m}_w$ can be represented as $\overline{\dot{m}_w}$ and described by the equation $$\overline{\dot{m}_w} = \frac{\dot{m}_w}{\dot{m}_{w,max}}$$

to provide a model that is applicable to a variety of different applications. A model with a single parameter that relates $\overline{\Delta T_w}$ to $\overline{\dot{m}_w}$ can be described by the equation $$\frac{1}{\overline{\Delta T_w}} = 1 + b\,\overline{\dot{m}_w}$$

which can be rewritten in the form $$y = b'x \text{ where } y = \overline{\dot{m}_w}, x = \frac{1}{\overline{\Delta T_w}} - 1, \text{ and } b' = \frac{1}{b}.$$

and b'=1/b. This model can be solved for the parameter b' using recursive least squares to dynamically predict the mass flow rate that corresponds to a minimum $\Delta T$ across coil 520. This predicted mass flow rate that corresponds to the minimum $\Delta T$ across coil 520 may be considered a second maximum flow rate that is distinct from the physical limit of the system ($\dot{m}_{w,max}$). Solving the model for the parameter b' may include solving the model for the parameter b' at the current time step and calculating a weighted sum of the parameter b' at the current time step and the parameter b' at one or more previous time steps. The parameter b' generally relates flow through coil 520 to the $\Delta T$ across coil 520. The use of such a model provides system 500 with feedforward-feedback control as opposed to only feedback control.

It will be appreciated that system 500 as shown in FIG. 5 is intended to be an example and the control techniques described herein are applicable to a variety of different systems. For example, chiller 502 may be replaced with a boiler (e.g., boiler 104) and heated fluid may be circulated through coil 520 to provide heating to a building space. Moreover, system 500 may include more than one pump, more than one coil, etc. Coil 520 or a similar component may generally be a component of a variety of different types of heat exchangers such as shell and tube heat exchangers, plate heat exchangers, and double pipe heat exchangers. The heat exchangers may have a variety of different flow configurations such as countercurrent flow, crossflow, concurrent flow, and hybrid flow. The heat exchangers may be part of a larger HVAC device such as AHU 106 as described above. Moreover, while not explicitly shown in FIG. 5, system 500 may generally include one or more fans that blow air over coil 520 in order to provide heating or cooling for a building space (e.g., fan 338). The fluid circulated through coil 520 may be water or another type of fluid. Flow sensor 510, valve 512, and actuator 514 may be components of a pressure-independent control valve configured to maintain a flow setpoint independent of pressure applied at the inlet of valve 512. Actuator 514 may also operate in accordance with a position setpoint for valve 512 and/or a power setpoint associated with coil 520.

Figure 6:
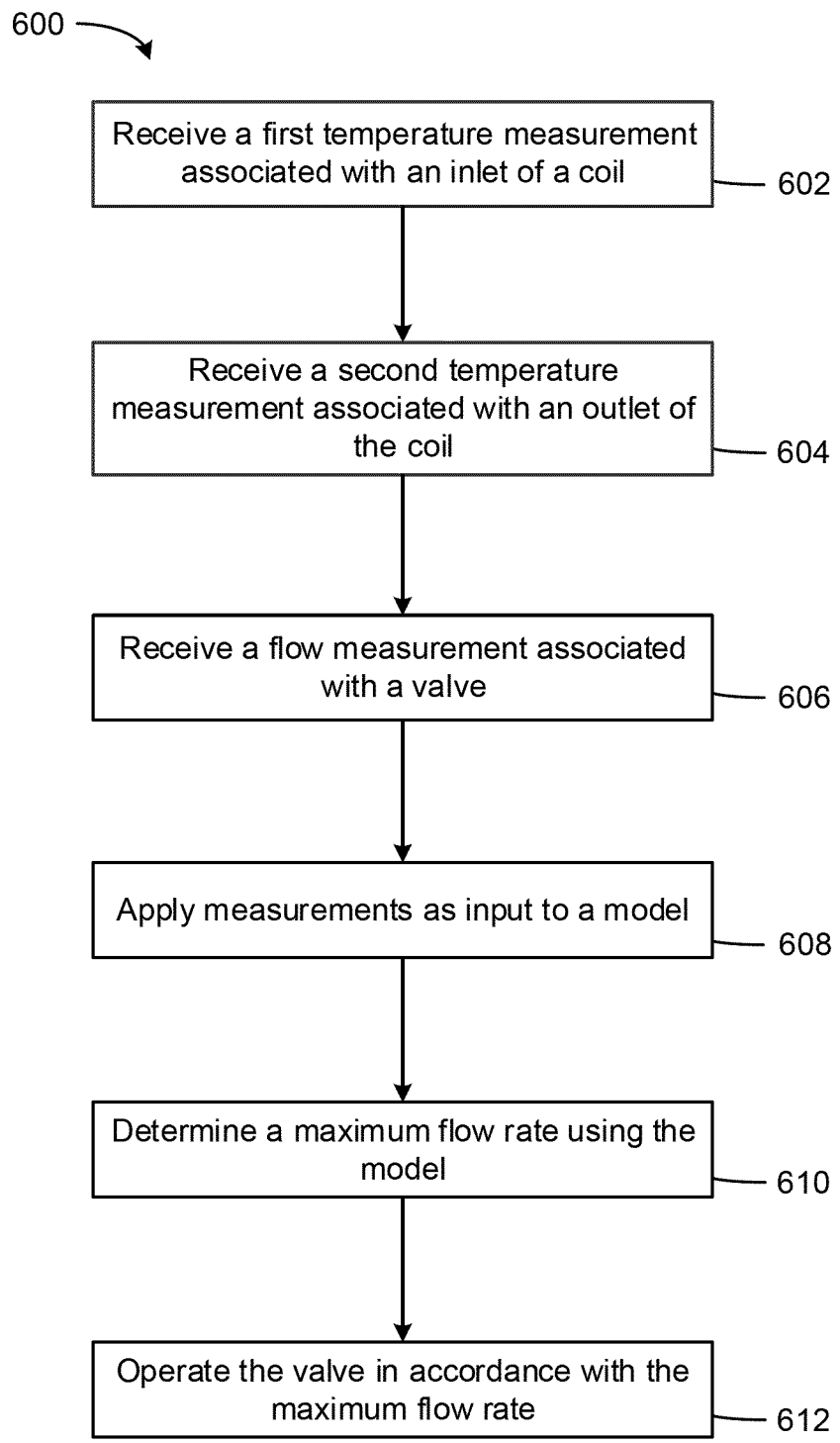
FIG. 6 is a flow diagram of a flow control process associated with the example system of FIG. 5, according to some embodiments.

Referring now to FIG. 6, a process 600 for controlling the flow of fluid through a coil in an HVAC system is shown, according to some embodiments. Process 600 may be performed by actuator 514 as part of the example system 500 described above, for example. Process 600 can be used to improve efficiency of a flow control system by reducing energy waste in a heating or cooling process. Process 600 can generally be used to impose an upper limit on the flow of water though a heating or cooling coil and thereby imposing a limit on the temperature change across the coil. The dynamic model-based approach described above facilitates quick response time when disturbances are introduced into the system (e.g., loss of airflow) and when setpoint changes occur to name a few examples. Process 600 can be used to conserve energy while still providing adequate heating and cooling to a building space.

Process 600 is shown to include receiving a first temperature measurement associated with an inlet of a coil (step 602). For example, the first temperature measurement may be received by actuator 514 from temperature sensor 522. Process 600 is also shown to include receiving a second temperature measurement associated with an outlet of the coil (step 604). For example, the second temperature measurement may be received by actuator 514 from temperature sensor 524. Process 600 is also shown to include receiving a flow measurement associated with a valve (step 606). For example, the flow measurement may be received by actuator 514 from flow sensor 510. Process 600 may also involve receiving a flow setpoint, a position setpoint, and/or a power setpoint. For example, actuator 514 may receive one or more setpoints form controller 530. It will be appreciated that additional flow measurements, temperature measurements, and other types of sensor data may be received in order to make control decisions for a system such as system 500 as well. For example, controller 530 and actuator 514 may receive data related to chiller 502 and pump 504 in addition to data related to air flow through the coil such as fan status, fan speed, and air temperature. This data may also be received by different devices such as higher-level controllers, a local server, a remote computing system, and the like.

Process 600 is also shown to include applying the first temperature measurement, the second temperature measurement, and the flow measurement as input to a model (step 608). For example, actuator 514 may execute control application 516 in order to determine a position for valve 512. The first temperature measurement, the second temperature measurement, and the flow measurement may generally be applied to a recursive model with a parameter that relates flow to the ΔT across the coil obtained by calculating a difference between the first temperature measurement and the second temperature measurement. Calculating the difference between the first temperature measurement and the second temperature measurement may include subtracting the second temperature measurement from the first temperature measurement or subtracting the first temperature measurement from the second temperature measurement depending if the application is a heating application or a cooling application. Calculating the difference between the first temperature measurement and the second temperature measurement may also include using an absolute value such that the difference is a positive number for both heating and cooling applications. In some embodiments, the model uses normalized parameters for flow and temperature. As described above, the model may generally take the form y=b'x where $$y = \bar{\dot{m}}_w, x = \frac{1}{\overline{\Delta T_w}} - 1,$$

and b' is the parameter that relates flow to the ΔT across the coil.

Process 600 is also shown to include determining a maximum flow rate that ensures that a difference between the first temperature measurement and the second temperature measurement is above a threshold using the model (step 610). This step may include solving the model for the parameter that relates flow to the ΔT across the coil at a current time step, and calculating a weighted sum of the parameter at the current time step and the parameter at a previous time step. In some embodiments, solving for the parameter at the current time step involves solving for the parameter using recursive least squares. However, other approaches are also contemplated.

Process 600 is also shown to include operating the valve in accordance with the maximum flow rate (step 612). For example, actuator 514 may close valve 512 if the flow measurement from flow sensor 510 is above the determined maximum flow rate. Moreover, different components of system 500 may be operated in accordance with the determined maximum flow rate such as chiller 502 and pump 504. If the reading from flow sensor 510 is above the determined maximum flow rate, chiller 502 and pump 504 can conserve power. Process 600 generally creates opportunities for improved efficiency of the flow control system as a whole.

Referring now to FIGS. 7-15, a variety of graphs demonstrating advantages of the systems and methods described herein are shown, according to various embodiments. These graphs generally show flow, temperature, power, and position as related to a system such as system 500 described above. Similar graphs are shown for systems that do not attempt to impose a limit on ΔT across a coil, systems that attempt to impose a limit on ΔT across a coil using feedback control, and systems that use a model-based approach to impose a limit on ΔT such as described herein. The graphs show how these systems impose a limit on ΔT and react to different changes such as disturbances and setpoint changes. It can be seen that the model-based approach provides more dynamic and robust flow control, thereby resulting in improved efficiency of the system as a whole. It can be assumed that the desired ΔT across the coil is above a minimum threshold of about 15 degrees Fahrenheit for these graphs. It will be appreciated that control application 516 may operate in different modes such as position control mode, flow control mode, and power control mode. As such, the setpoints shown in FIGS. 7-15 may not all be applicable at the same time. For example, the system may only change the flow setpoint, the position setpoint, the power setpoint, or any combination thereof. However, example setpoints are illustrated for each of flow, power, and position. The power setpoint as described below may generally be a target power output associated with the coil.

Figure 7:
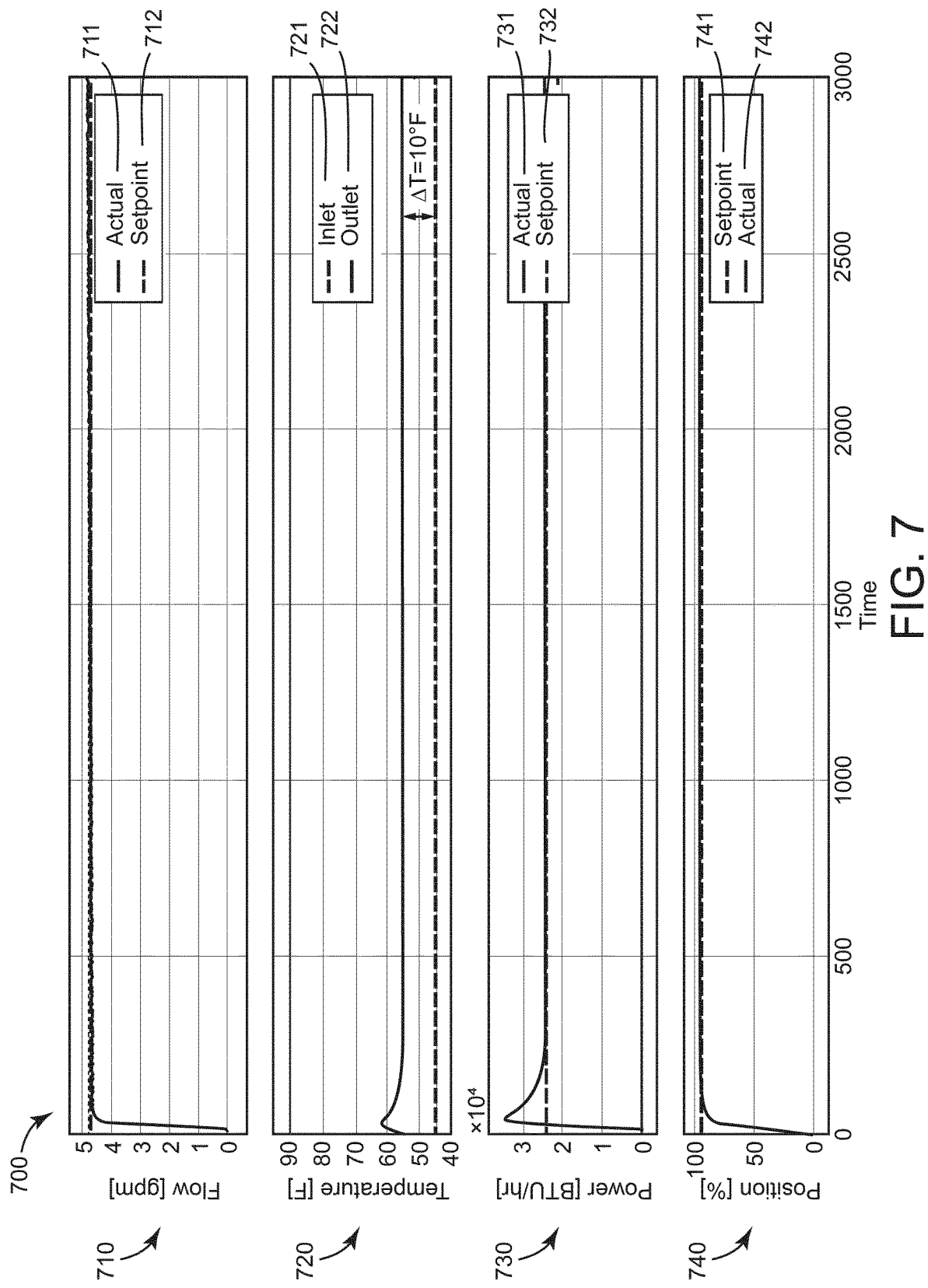
FIG. 7 is a series of graphs showing performance of a system that does not attempt to impose a limit on the temperature change across a coil associated with the system of FIG. 5, according to some embodiments.

Referring specifically to FIG. 7, a series of graphs 700 showing behavior of a system that does not attempt to impose a limit on ΔT across a coil is shown, according to some embodiments. Graph 710 depicts flow of fluid through a coil such as coil 520 described above. This flow can be controlled by an actuator such as actuator 514 by moving the position of a valve such as valve 512 described above. Graph 710 show that the flow setpoint 712 is approximately 5 gallons per minute and, as a result, the actual flow 711 through the coil is also about 5 gallons per minute. Graph 740 depicts the position of the valve between a fully-open position (100%) and a fully-closed position (0%). It can be seen that the position setpoint 741 and the actual position 742 for the valve remain mostly open in an effort to achieve the high flow setpoint.

Graph 720 depicts temperatures in degrees Fahrenheit associated with the coil. The temperature at the inlet of the coil 721 (e.g., as measured by sensor 522) as well as the temperature at the outlet of the coil 722 (e.g., as measured by sensor 524) can both be seen. From graph 720, it can be seen that the ΔT across the coil remains at about 10 degrees Fahrenheit, which is below the minimum threshold of 15 degrees Fahrenheit. Since the system does not attempt to impose a limit on ΔT across the coil, the system operates inefficiently. Graph 730 depicts power output of the coil in units of British thermal units per hour, including the power setpoint 732 and the actual power output of the coil 731. It can be seen from graph 730 that the coil outputs about 25,000 BTUs per hour, which is in line with the setpoint. Graphs 700 generally show that, when there is too much flow of liquid through the coil, the system operates inefficiently.

Figure 8:
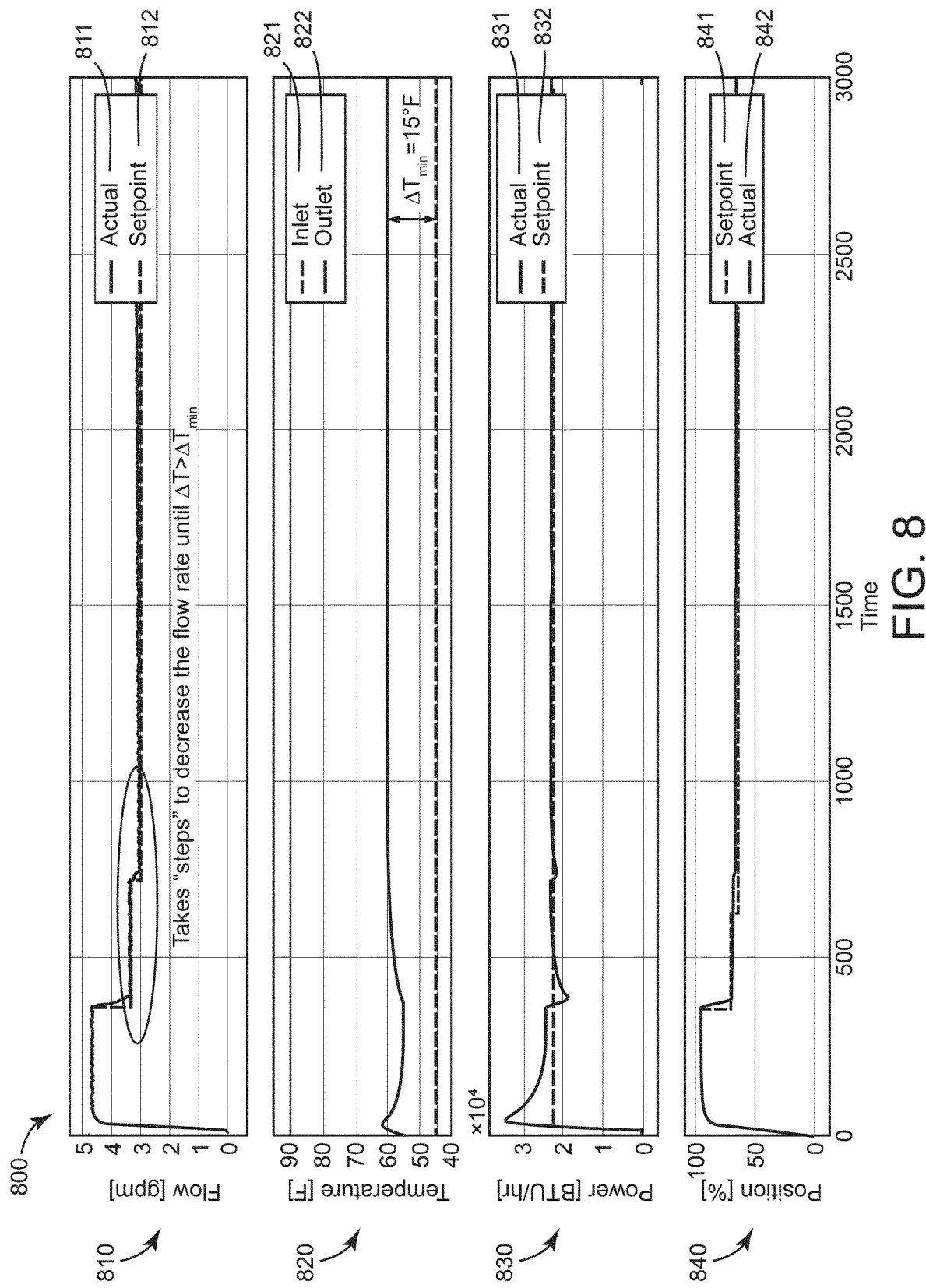
FIG. 8 is a series of graphs showing performance of a system that attempts to impose a limit on the temperature change across a coil associated with the system of FIG. 5 using feedback control, according to some embodiments.

Referring specifically to FIG. 8, a series of graphs 800 showing behavior of a system that attempts to impose a limit on ΔT across a coil using feedback control only is shown, according to some embodiments. As shown in graph 810, the system begins with a flow setpoint 812 of about 5 gallons per minute. However, as shown in graph 820, the ΔT between the inlet temperature 821 and the outlet temperature 822 is initially below the minimum threshold of 15 degrees Fahrenheit, so the system adjusts the flow setpoint 812 in an effort to raise the ΔT. As shown by graph 840, the position setpoint 841 and the actual position 842 of the valve is adjusted along with the flow setpoint. However, as can be seen in graph 810, this system must take "steps" to find the flow rate that achieves the minimum ΔT. The actual flow rate 811 generally follows the flow setpoint 812, however the time needed to find an acceptable flow rate creates inefficiency. As shown by graph 830, however, the actual output of the coil 831 is still nearly 25,000 BTU/hour, which is about even with the power setpoint 832, while requiring less flow (about 3 gallons per minute) than the system shown in graphs 700. As a result, the system of graphs 800 is more efficient than the system of graphs 700, but the steps required to find the correct flow rate still results in temporary reduction of power output as demonstrated by graph 830 and other inefficiencies.

Figure 9:
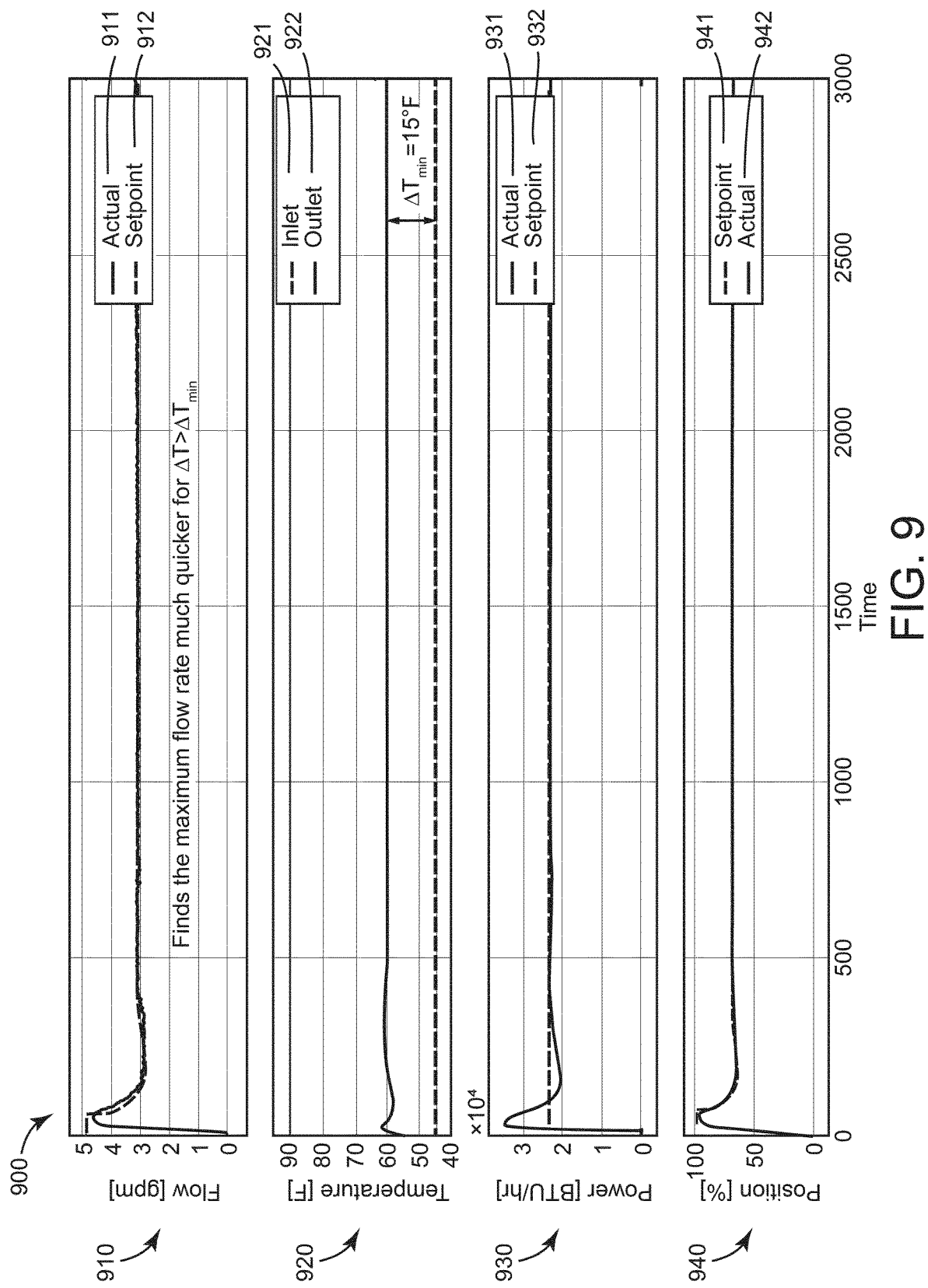
FIG. 9 is a series of graphs showing performance of a system that attempts to impose a limit on the temperature change across a coil associated with the system of FIG. 5 using a dynamic model-based approach, according to some embodiments.

Referring specifically to FIG. 9, a series of graphs 900 showing behavior of a system that attempts to impose a limit on ΔT across a coil using a dynamic model-based approach is shown, according to some embodiments. Similar to graphs 710 and 810, the system initially starts off with a flow setpoint 912 of about 5 gallons per minute. However, as shown in graph 920, the ΔT between the inlet temperature 921 and the outlet temperature 922 is initially below the minimum threshold of 15 degrees Fahrenheit, so the system adjusts the flow setpoint 912 in an effort to raise the ΔT. As shown by graph 940, the position setpoint 941 and the actual position 942 of the valve are adjusted along with the flow setpoint. However, unlike in graph 810 where the system must take steps to find the flow rate that achieves the minimum ΔT, the model-based approach determines a maximum flow rate that ensures that the ΔT is above the minimum threshold of 15 degrees Fahrenheit more quickly than the feedback-only approach, and therefore can achieve improved efficiency.

Figure 10:
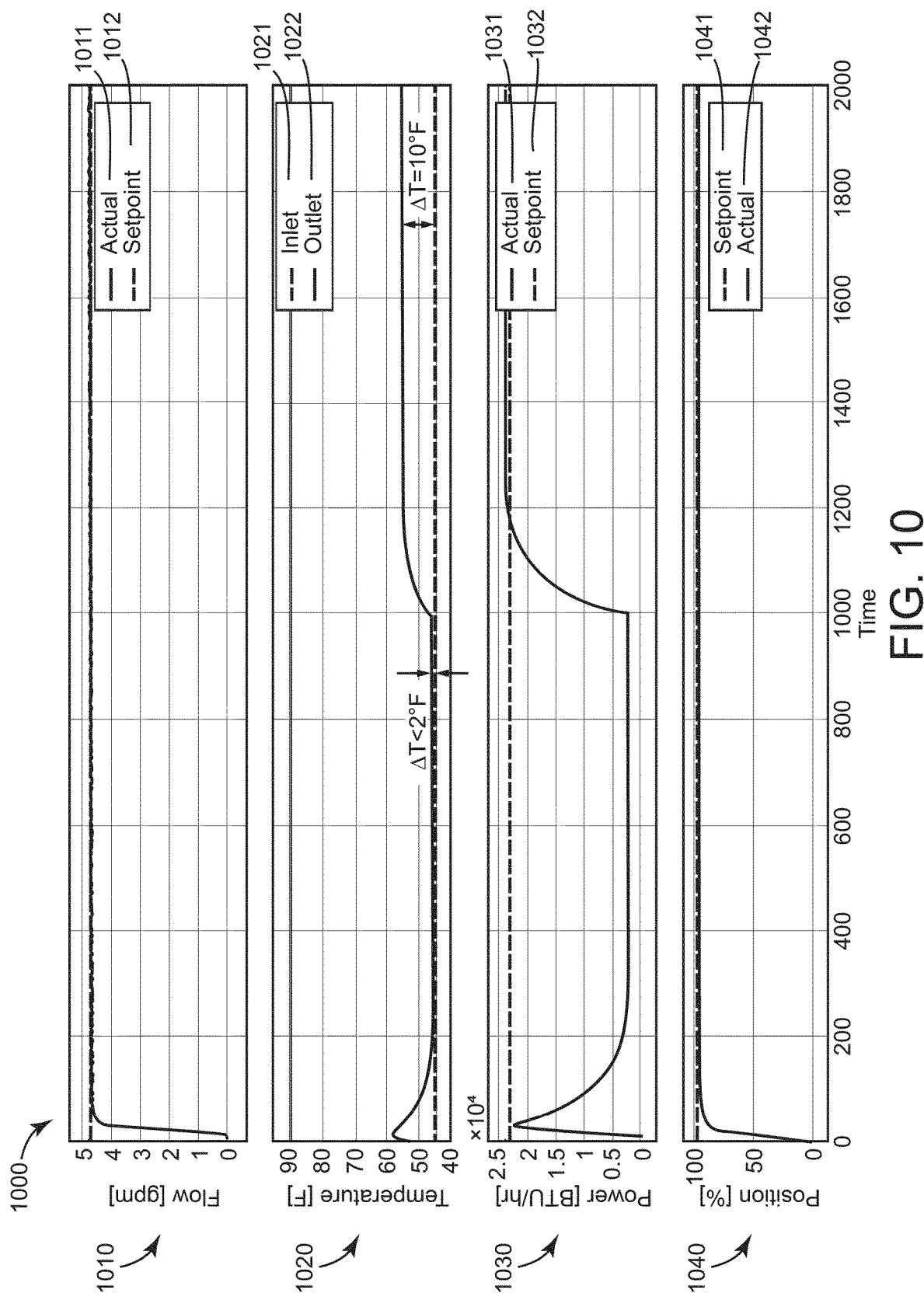
FIG. 10 is a series of graphs showing performance of the system of FIG. 7 in response to a disturbance, according to some embodiments.

Referring specifically to FIG. 10, a series of graphs 1000 showing behavior of a system that does not attempt to impose a limit on ΔT across a coil (e.g., the system of graphs 700) when a disturbance is introduced is shown, according to some embodiments. In this case, the disturbance is a loss of airflow across the coil (e.g., due to failure of fan 338). However, disturbances may happen for a variety of different reasons. Similar to graph 710, it can be seen from graph 1010 that the flow setpoint 1012 and the actual flow 1011 begin at about 5 gallons per minute. Also, from graph 1040, it can be seen that the valve position setpoint 1041 and actual valve position 1042 remain near the fully-open position. From graph 1020, it can be seen that the ΔT between the inlet temperature 1021 and the outlet temperature 1022 falls well below the desired threshold of 15 degrees Fahrenheit to about 2 degrees Fahrenheit due to the loss of airflow. Similarly, from graph 1030, it can be seen that the actual power output 1031 by the coil is significantly reduced due to the loss of airflow, even though the power setpoint 1032 remains near 25,000 BTU/hour. When the airflow comes back, the power output 1031 returns near the setpoint 1031, however the ΔT still remains below the minimum threshold, and the system operates inefficiently. Graphs 1000 generally show that the system does not react to the disturbance (e.g., by adjusting the flow setpoint 1012) and does not maintain anywhere close to the desired ΔT as a result, even though the system is generating significant flow through the coil. The energy required to generate this flow is mostly wasted.

Figure 11:
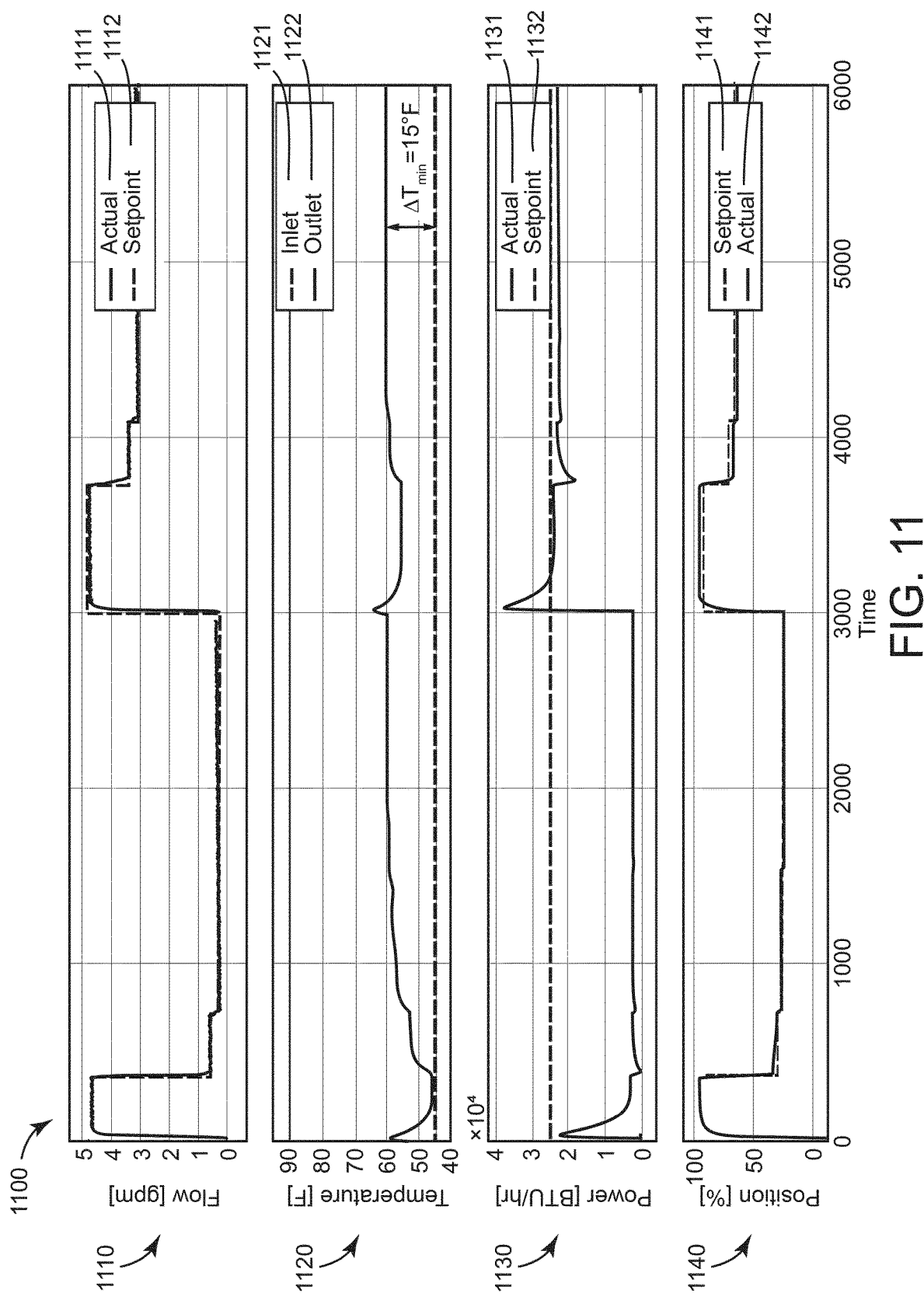
FIG. 11 is a series of graphs showing performance of the system of FIG. 8 in response to a disturbance, according to some embodiments.

Referring specifically to FIG. 11, a series of graphs 1100 showing behavior of a system that attempts to impose a limit on ΔT across a coil using feedback control (e.g., the system of graphs 800) when a disturbance is introduced is shown, according to some embodiments. In this case, the disturbance is again a loss of airflow across the coil. Similar to graph 810, it can be seen from graph 1110 that the flow setpoint 1112 and the actual flow 1111 begin near 5 gallons per minute. Also, from graph 1140, it can be seen that the valve position setpoint 1141 and actual valve position 1142 begin near the fully-open position. From graph 1120, it can be seen that the ΔT between the inlet temperature 1121 and the outlet temperature 1122 falls below the desired threshold of 15 degrees Fahrenheit due to the loss of airflow. Similarly, from graph 1130, it can be seen that the actual power output 1131 by the coil is significantly reduced due to the loss of airflow, even though the power setpoint 1132 remains near 25,000 BTU/hour. However, unlike the system of graphs 1000, the system of graphs 1100 attempts to lower the flow setpoint 1112 and the position setpoint 1142 in an effort to raise the ΔT. However, similar to the system of graphs 800, steps must be taken to do so, thereby resulting in inefficiency. When the airflow comes back, steps must be taken again to find a flow rate that ensures the ΔT remains above the minimum threshold. While the system of graphs 1100 is more efficient than the system of graphs 1000, inefficiency still remains due to the limitations of the feedback control approach.

Figure 12:
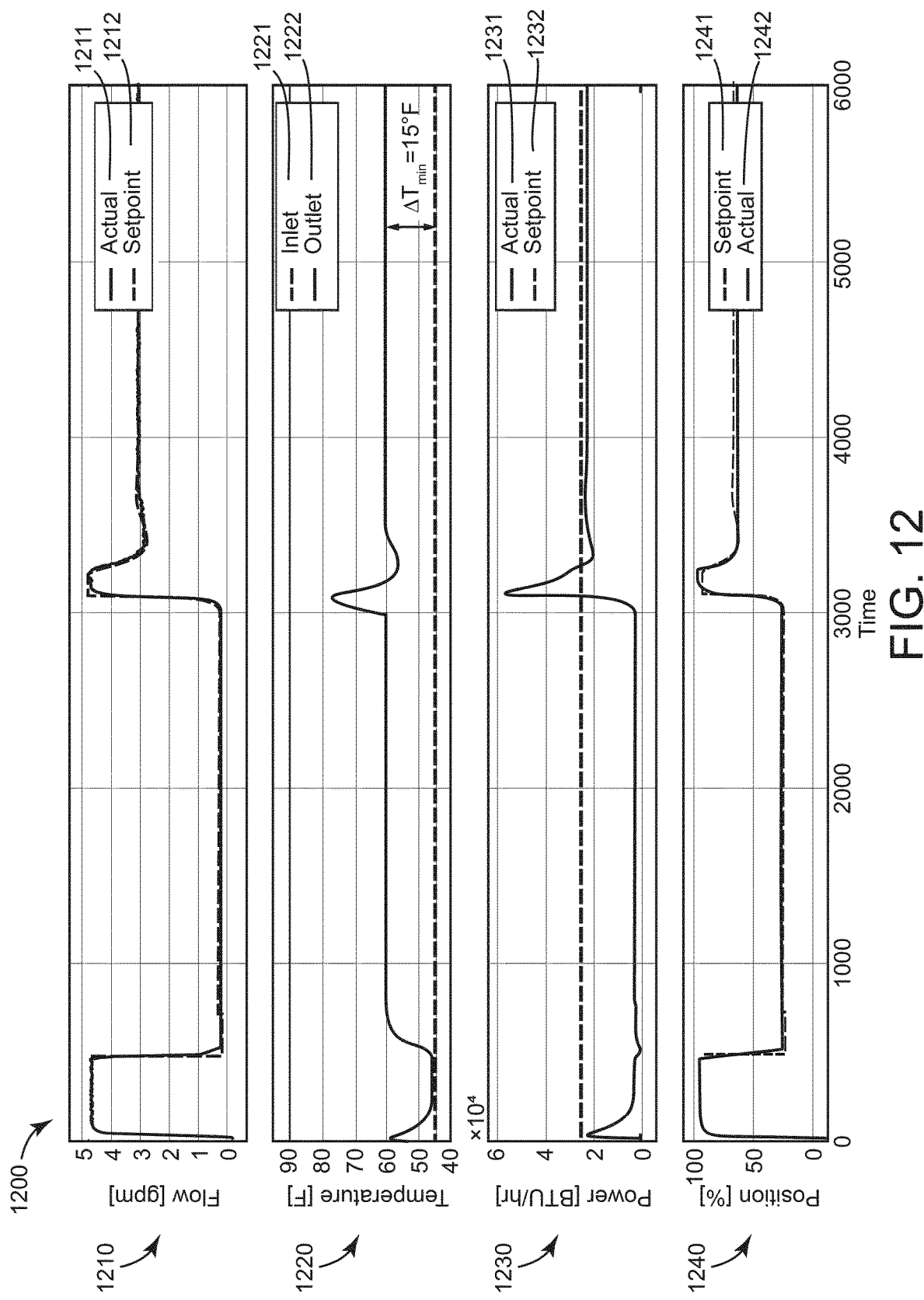
FIG. 12 is a series of graphs showing performance of the system of FIG. 9 in response to a disturbance, according to some embodiments.

Referring specifically to FIG. 12, a series of graphs 1200 showing behavior of a system that attempts to impose a limit on ΔT across a coil using a dynamic model-based approach (e.g., the system of graphs 900) when a disturbance is introduced is shown, according to some embodiments. In this case, the disturbance is again a loss of airflow across the coil. Similar to graph 910, it can be seen from graph 1210 that the flow setpoint 1212 and the actual flow 1211 begin near 5 gallons per minute. Also, from graph 1240, it can be seen that the valve position setpoint 1241 and actual valve position 1242 begin near the fully-open position. From graph 1220, it can be seen that the ΔT between the inlet temperature 1221 and the outlet temperature 1222 falls below the desired threshold of 15 degrees Fahrenheit due to the loss of airflow. Similarly, from graph 1230, it can be seen that the actual power output 1231 by the coil is significantly reduced due to the loss of airflow, even though the power setpoint 1232 remains near 25,000 BTU/hour. Similar to the system of graphs 1100, the system of graphs 1200 attempts to lower the flow setpoint 1212 and the position setpoint 1242 in an effort to raise the ΔT. However, unlike the system of graphs 1100, the system of graphs 1200 does not need to take steps to do so, thereby resulting in improved efficiency. When the airflow comes back, the system quickly finds a flow rate that ensures the ΔT remains above the minimum threshold.

Figure 13:
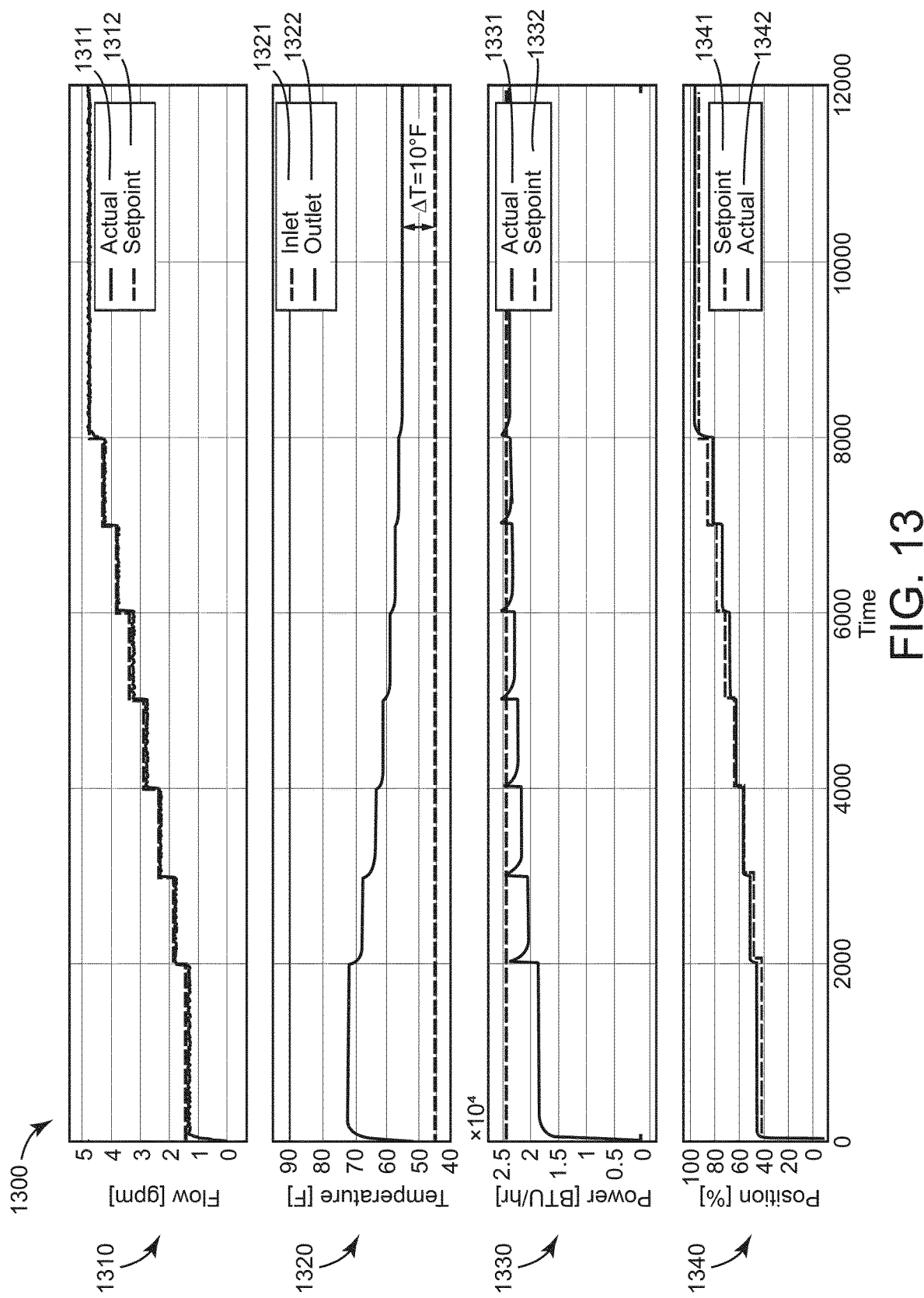
FIG. 13 is a series of graphs showing performance of the system of FIG. 7 in response to setpoint changes, according to some embodiments.

Referring specifically to FIG. 13, a series of graphs 1300 showing behavior of a system that does not attempt to impose a limit on ΔT across a coil (e.g., the system of graphs 700 and 1000) in response to setpoint changes is shown, according to some embodiments. From graph 1310, it can be seen that the flow setpoint 1312 and the actual flow 1311 are slowly increased until they approach about 5 gallons per minute. Similarly, the actual valve position 1342 and the valve position setpoint 1341 are slowly increased until they approach the fully-open position. From graph 1330, it can be seen that the power output 1331 by the coil increases towards the power setpoint 1332 of about 25,000 BTU/hour. However, the power output 1331 increases at a slower rate than the increase in flow rate 1311, especially as the ΔT between the inlet temperature 1321 and the outlet temperature 1322 falls below the desired minimum of 15 degrees Fahrenheit as shown in graph 1320. As such, the system operates inefficiently.

Figure 14:
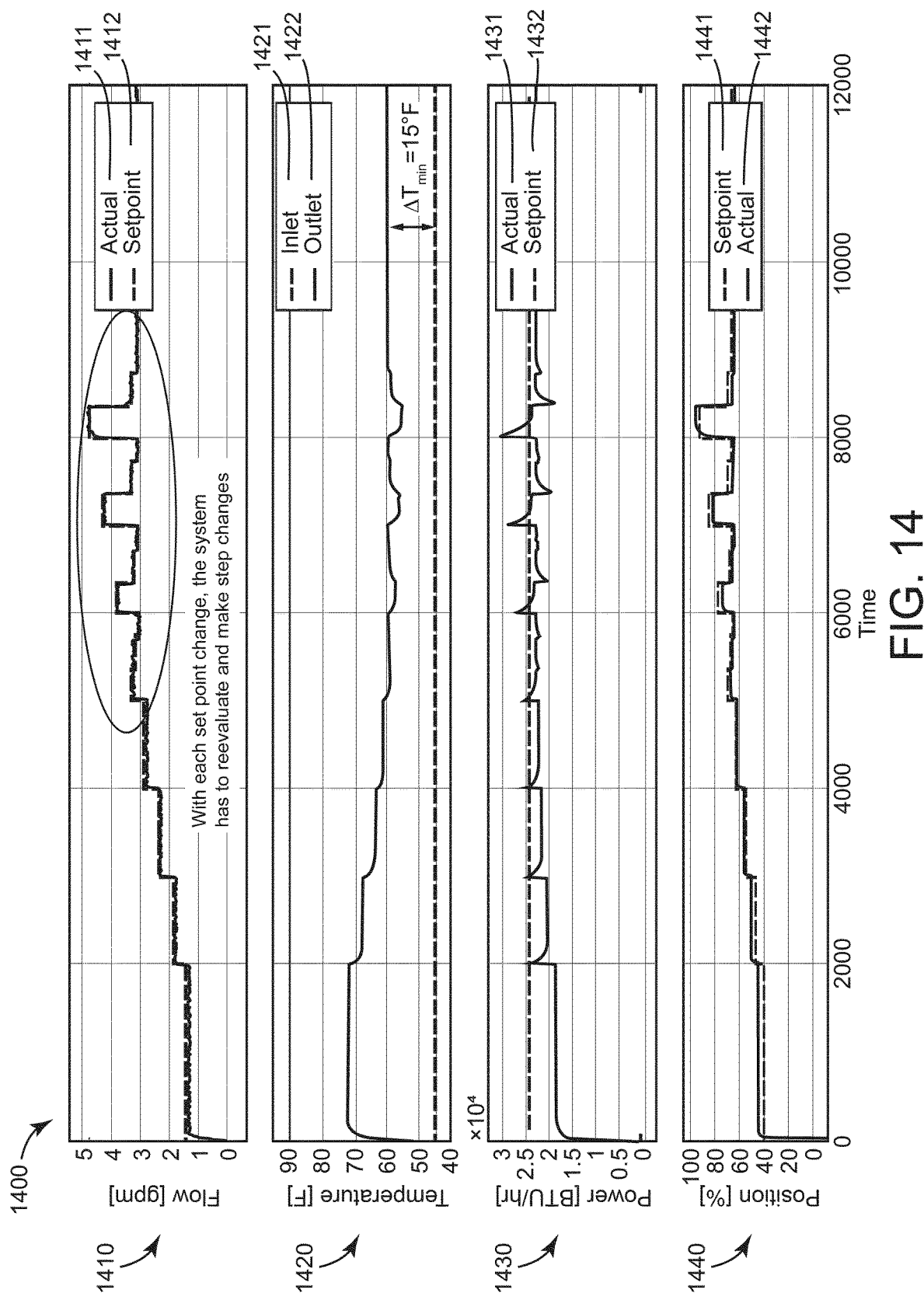
FIG. 14 is a series of graphs showing performance of the system of FIG. 8 in response to setpoint changes, according to some embodiments.

Referring specifically to FIG. 14, a series of graphs 1400 showing behavior of a system that attempts to impose a limit on ΔT across a coil using feedback control (e.g., the system of graphs 800 and 1100) in response to setpoint changes is shown, according to some embodiments. Similar to graph 1310, graph 1410 shows that the flow setpoint 1412 and actual flow 1411 are slowly increased towards about 5 gallons per minute. Likewise, the valve position 1441 and valve position setpoint 1442 are slowly increased towards the fully-open position. However, unlike the system of graphs 1300, it can be seen that the system of graphs 1400 attempts to adjust the flow setpoint each time the ΔT between the inlet temperature 1421 and the outlet temperature 1422 falls below the desired minimum of 15 degrees Fahrenheit as a result of setpoint changes as shown in graph 1420. This phenomenon creates inefficiency and results in fluctuations in the power output 1431 as related to the power setpoint 1432 as shown in graph 1430. While the system of graphs 1400 operates more efficiently than the system of graphs 1300, further improvements in efficiency are still desirable.

Figure 15:
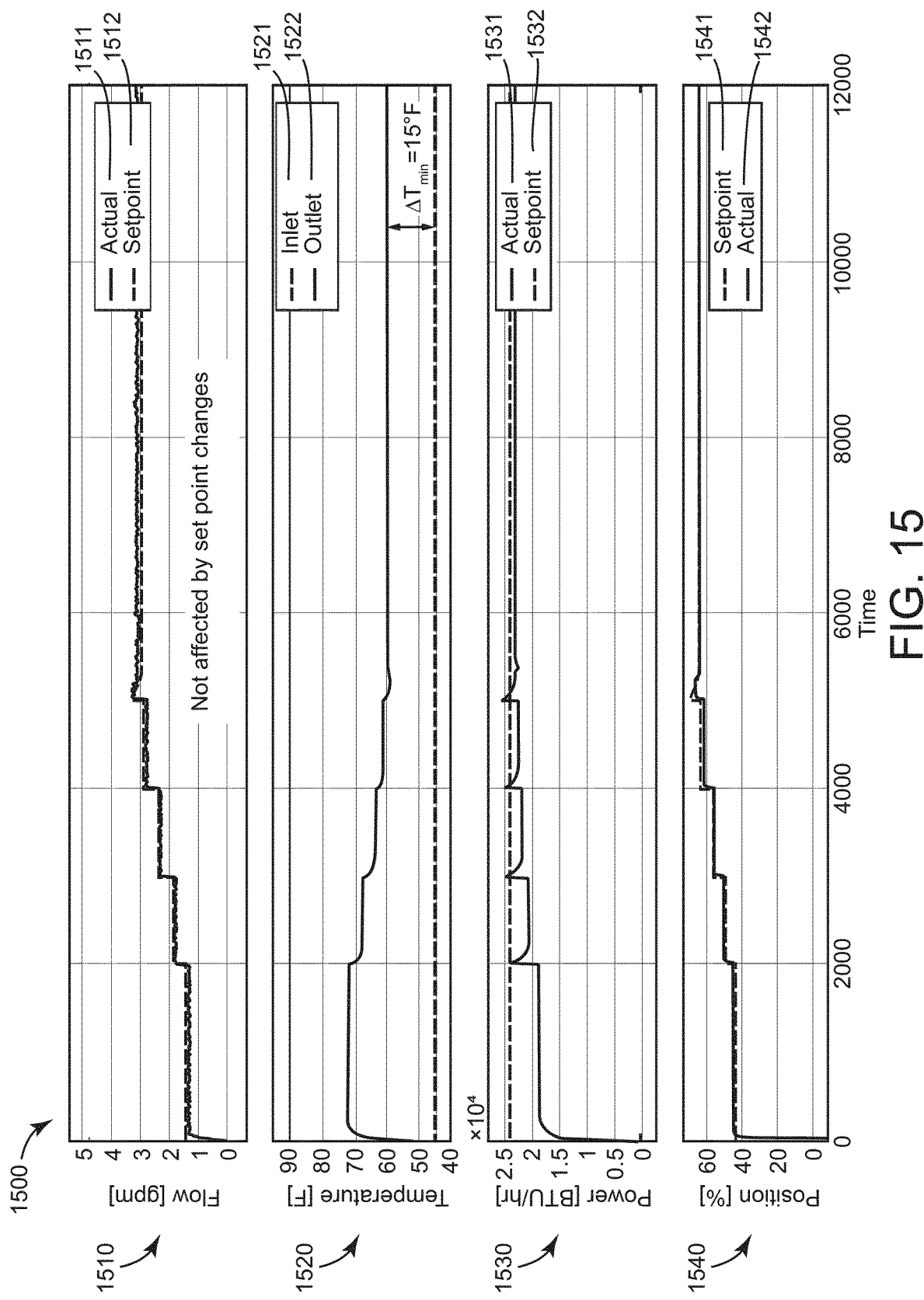
FIG. 15 is a series of graphs showing performance of the system of FIG. 9 in response to setpoint changes, according to some embodiments.

Referring specifically to FIG. 15, a series of graphs 1500 showing behavior of a system that attempts to impose a limit on ΔT across a coil using a dynamic model-based approach (e.g., the system of graphs 900 and 1200) in response to setpoint changes is shown, according to some embodiments. Similar to graph 1410, graph 1510 shows that the flow setpoint 1512 and actual flow 1511 are slowly increased towards about 5 gallons per minute. Likewise, the valve position 1541 and valve position setpoint 1542 are slowly increased towards the fully-open position. However, unlike the system of graphs 1400, it can be seen that the system of graphs 1500 does not need to reevaluate each new setpoint change, as the model-based approach allows the system to dynamically determine a maximum flow rate and does not allow the flow setpoint 1512 to go above this maximum rate. As such, as shown in graph 1520, the ΔT between the inlet temperature 1521 and the outlet temperature 1522 does not fall below the desired minimum of 15 degrees Fahrenheit as shown in graph 1520. Moreover, the power output 1531 does not fluctuate with respect to the power setpoint 1532. As such, the system of graphs 1500 achieves improved efficiency over the system of graphs 1400.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for operating a valve that controls flow of a liquid through a coil in a heating, ventilation, or air conditioning (HVAC) system, the method comprising:
receiving a first temperature measurement associated with an inlet of the coil;
receiving a second temperature measurement associated with an outlet of the coil;
receiving a flow measurement associated with the valve;
applying the first temperature measurement, the second temperature measurement, and the flow measurement as input to a model;
determining a maximum flow rate that ensures that a difference between the first temperature measurement and the second temperature measurement is above a threshold using the model, wherein the model defines a relationship between flow rate through the valve and the difference between the first temperature measurement and the second temperature measurement such that the difference between the first temperature measurement and the second temperature measurement decreases toward the threshold as the flow rate through the valve increases toward the maximum flow rate; and
operating the valve in accordance with the maximum flow rate.

2. The method of claim 1, wherein the model comprises a recursive model with a parameter that relates the flow measurement to the difference between the first temperature measurement and the second temperature measurement.

3. The method of claim 2, wherein determining the maximum flow rate comprises:
solving the model for the parameter at a current time step; and
calculating a weighted sum of the parameter at the current time step and the parameter at one or more previous time steps.

4. The method of claim 3, wherein solving the model for the parameter at the current time step comprises solving for the parameter using recursive least squares.

5. The method of claim 1, further comprising operating a pump of the HVAC system in accordance with the maximum flow rate.

6. The method of claim 1, wherein operating the valve in accordance with the maximum flow rate comprises operating the valve in accordance with a flow setpoint that is less than the maximum flow rate.

7. The method of claim 1, further comprising operating a chiller of the HVAC system or a boiler of the HVAC system in accordance with the maximum flow rate.

8. A heating, ventilation, or air conditioning (HVAC) system comprising:
a coil that facilitates heating or cooling;
a valve that controls flow of a liquid through the coil;
a pump that provides the liquid at an inlet of the valve;
an actuator that controls a position of the valve;
a controller comprising a processor and a memory, the memory comprising a control application that, when executed by the controller, causes the controller to:
receive a first temperature measurement associated with an inlet of the coil;
receive a second temperature measurement associated with an outlet of the coil;
receive a flow measurement associated with the inlet of the valve;
apply the first temperature measurement, the second temperature measurement, and the flow measurement as input to a model;
determine a maximum flow rate that ensures that a difference between the first temperature measurement and the second temperature measurement is above a threshold using the model, wherein the model defines a relationship between flow rate through the valve and the difference between the first temperature measurement and the second temperature measurement such that the difference between the first temperature measurement and the second temperature measurement decreases toward the threshold as the flow rate through the valve increases toward the maximum flow rate; and
provide a control signal to the actuator to operate the valve in accordance with the maximum flow rate.

9. The system of claim 8, wherein the model comprises a recursive model with a parameter that relates the flow measurement to the difference between the first temperature measurement and the second temperature measurement.

10. The system of claim 9, wherein the control application causes the controller to:
solve the model for the parameter at a current time step;
calculate a weighted sum of the parameter at the current time step and the parameter at one or more previous time steps; and
determine the maximum flow rate using the weighted sum.

11. The system of claim 10, wherein the control application causes the controller to solve the model for the parameter at the current time step using recursive least squares.

12. The system of claim 8, wherein the control application causes the controller to provide a control signal to the pump to control operation of the pump in accordance with the maximum flow rate.

13. The system of claim 8, further comprising a chiller that produces the liquid, wherein the control application causes the controller to provide a control signal to the chiller to control operation of the chiller in accordance with the maximum flow rate.

14. The system of claim 8, wherein the control signal comprises a flow setpoint that is maintained by the valve, and wherein the flow setpoint is less than the maximum flow rate.

15. A flow control device for use in a heating, ventilation, or air conditioning (HVAC) system, the device comprising:
a valve that controls flow of a liquid through a coil;
an actuator that controls a position of the valve, the actuator comprising a processor and a memory, the memory comprising a control application that, when executed by the actuator, causes the actuator to:

receive a first temperature measurement associated with an inlet of the coil;
receive a second temperature measurement associated with an outlet of the coil;
receive a flow measurement associated with an inlet of the valve;
apply the first temperature measurement, the second temperature measurement, and the flow measurement as input to a model;
determine a maximum flow rate that ensures that a difference between the first temperature measurement and the second temperature measurement is above a threshold using the model, wherein the model defines a relationship between flow rate through the valve and the difference between the first temperature measurement and the second temperature measurement such that the difference between the first temperature measurement and the second temperature measurement decreases toward the threshold as the flow rate through the valve increases toward the maximum flow rate; and
operate the valve in accordance with the maximum flow rate.

16. The device of claim 15, wherein the model comprises a recursive model with a parameter that relates the flow measurement to the difference between the first temperature measurement and the second temperature measurement.

17. The device of claim 16, wherein the control application causes the actuator to:
solve the model for the parameter at a current time step;
calculate a weighted sum of the parameter at the current time step and the parameter at one or more previous time steps; and
determine the maximum flow rate using the weighted sum.

18. The device of claim 17, wherein the control application causes the actuator to solve the model for the parameter at the current time step using recursive least squares.

19. The device of claim 15, wherein the control application causes the actuator to operate the valve in accordance with a flow setpoint that is less than the maximum flow rate.

20. The device of claim 19, wherein the actuator receives the flow setpoint from another device in the HVAC system.

* * * * *